A. LEHNER.
PROCESS FOR COPYING FROM POLYCHROMIC SCREEN NEGATIVES.
APPLICATION FILED JAN. 17, 1910.
1,113,359. Patented Oct. 13, 1914.
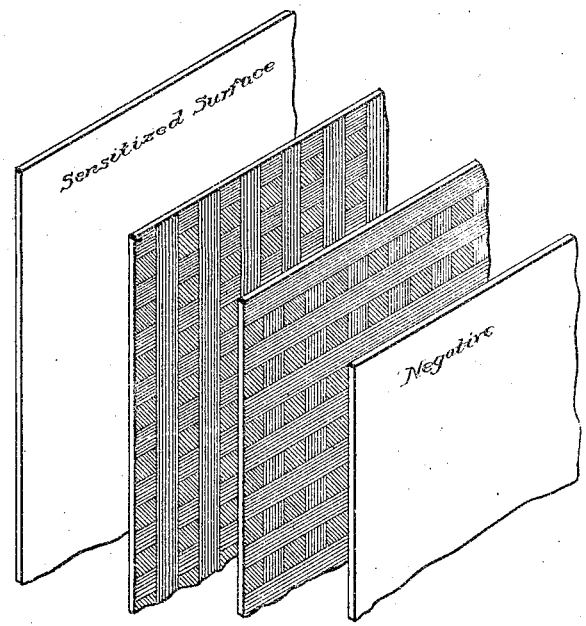

UNITED STATES PATENT OFFICE.

ALFRED LEHNER, OF HELSTERBACH-ON-THE-MAIN, GERMANY, ASSIGNOR TO EASTMAN KODAK COMPANY, OF ROCHESTER, NEW YORK, A CORPORATION OF NEW YORK.

PROCESS FOR COPYING FROM POLYCHROMIC-SCREEN NEGATIVES.

1,113,359. Specification of Letters Patent. Patented Oct. 13, 1914.

Application filed January 17, 1910. Serial No. 538,514.

*To all whom it may concern:*

Be it known that I, ALFRED LEHNER, citizen of Switzerland, residing at Helsterbach-on-the-Main, Germany, have invented certain new and useful Improvements in Processes for Copying from Polychromic-Screen Negatives; and I do hereby declare the following to be a full, clear, and exact description of the invention, such as will enable others skilled in the art to which it appertains to make and use the same.

It is already known that any desired number of positive copies can be made from polychrome screen negatives obtained with the help of three-color-ruled screens by suitably exposing sensitized surfaces covered with similar color screens below said negatives.

When screens are used in which the three colors cover the surface of the screen as parallel lines ranged close to one another, it is only possible to obtain a good picture by crossing the two screens, namely, the negative and the positive, at a certain angle; if this is not done a cloud or wave pattern will appear in the positive copy. Also in the case of three color screens, in which only one of the three colors appears as an uninterrupted line, the other two colors filling up the intervening space as alternating dots of color, a wave pattern, less conspicuous that in the above case, will be produced, unless the two screens are crossed at a suitable angle, advantageously 45°. By this crossing at an angle the wave pattern can be avoided, but in practice it has been found that it is not possible in this way to obtain a color-true picture, since the color of the uninterrupted lines always predominates, as does also its complementary color, while the addition of said uninterrupted lines and the other color elements appears inadequate. If, for instance, color screens are used in which the red lines are uninterrupted and green and blue fill up the spaces between the red lines in the form of small squares, in the positive copy red and blue-green will appear very well, while yellow and purple do not appear. If, on the other hand, the blue lines are uninterrupted, red and green filling up the intervening spaces in the form of dots or the like, the positive copy will show blue and yellow to advantage, while the green and red tones will be more or less wanting. The cause of this phenomenon has not yet been discovered, but I have found means, whereby this disadvantage may be done away with. The method consists in choosing for the uninterrupted lines of the positive screen one of those colors which in the negative screen was used for filling the intervening spaces between the lines. It has been found advantageous to use red as the uninterrupted lines of the negative and blue for the uninterrupted lines of the positive.

In the drawing I have illustrated diagrammatically the manner of carrying out the process, and as it is impractical to show in a drawing both the sensitized coating on the positive and the developed image on the negative and also the colors of the screen in a single figure, the various parts have been shown separated.

The negative screen is indicated by $S'$ and the developed image thereon by the word "Negative," the positive screen by $S^2$ and the emulsion thereon by the words "Sensitized surface." The colored portions of the screens are of course greatly magnified and one example of the coloring is illustrated by the conventional shading. Further, the intensity of the colors in the positive screen may be chosen greater, equal to or less than that of the negative screen, in order to give the positive picture a greater or lesser brilliancy. Also, in the positive screen the three colors selected may be dissimilar to those of the negative screen, especially in those cases in which a different emulsion is used for negative and positive. For instance, when a highly sensitive emulsion is used for the negative and a less sensitive silver-chlorid or chlor-bromid emulsion is used for the positive. According to the varying sensitiveness for red, green and blue the color intensity and absorption of the positive screen will be varied.

According to this process, pictures copied by crossing the screens at an angle will show all color tones equally well. It is, of course, understood that in the screens referred to as having uninterrupted lines, there are a plurality of such lines of the same color arranged at equal distances apart, as in the usual ruled screens now in use, and in one feature of my invention, the portions between these repeated lines of the same color may be either continuous or interrupted.

What I claim as my invention and desire to secure by Letters Patent, is:

1. In the art of copying from polychrome screen negatives, the process which consists in exposing the sensitive surface through a multicolor screen in which continuous lines of one color alternate with interrupted lines of the other color or colors employed in the screen and concurrently through a second screen also having continuous lines alternating with interrupted lines crossing the lines of the first screen, the continuous lines of the first screen being of a different color from that of the continuous lines of the second screen.

2. In the art of copying from polychrome screen negatives, the process which consists in exposing the sensitive surface to a multicolor screen in which continuous lines alternate with interrupted lines, and, concurrently through a second screen also having continuous lines of one color alternating with lines of other colors, said lines crossing the lines of the first screen, the continuous lines of the second screen being of the same color as one of the series of interrupted lines of the first screen.

3. In the art of copying from polychrome screen negatives, the process which consists in exposing the sensitive surface to a multicolor screen in which continuous lines of one color alternate with interrupted lines of another color or colors, and, concurrently to a second screen also having continuous lines of one color alternating with interrupted lines of another color or colors the lines of the second screen crossing those of the first screen, the continuous lines of the second screen being of a color different from that of the continuous lines of the first screen, and the colors of the second screen also being of different intensity from those of the first screen.

4. In the art of copying from polychrome screen negatives, the process which consists in exposing the sensitive surface through the multicolor screen in which continuous lines alternate with interrupted lines, and, concurrently through a second screen also having continuous lines of one color alternating with lines of other colors, and lines crossing the lines of the first screen, the continuous lines of the second screen being of the same color as one of the series of interrupted lines of the first screen and the colors of the one screen differing in intensity from those of the other screen.

In testimony whereof I hereunto affix my signature in the presence of two witnesses.

ALFRED LEHNER.

Witnesses:
JEAN GRUND,
CARL GRUND.